(12) United States Patent
Kundalkar et al.

(10) Patent No.: US 12,693,406 B2
(45) Date of Patent: *Jul. 28, 2026

---

(54) RADIO FREQUENCY (RF)-BASED RANGING AND IMAGING IN A WIRELESS COMMUNICATIONS CIRCUIT, PARTICULARLY FOR A WIRELESS COMMUNICATIONS SYSTEM (WCS)

(71) Applicant: ANI Acquisition Sub, LLC, Boca Raton, FL (US)

(72) Inventors: Siddhartha Dhananjaya Kundalkar, Lemon Grove, CA (US); Brenndon Byung-Taek Lee, San Diego, CA (US); Farhan Aslam Qazi, San Diego, CA (US)

(73) Assignee: ANI Acquisition Sub, LLC, Boca Raton, FL (US)

( * ) Notice: Subject to any disclaimer, the term of this patent is extended or adjusted under 35 U.S.C. 154(b) by 378 days.

This patent is subject to a terminal disclaimer.

(21) Appl. No.: 18/080,143

(22) Filed: Dec. 13, 2022

(65) Prior Publication Data

US 2023/0114713 A1     Apr. 13, 2023

Related U.S. Application Data

(63) Continuation of application No. 16/809,242, filed on Mar. 4, 2020, now Pat. No. 11,543,516.

(51) Int. Cl.
| | |
|---|---|
| *G01S 13/89* | (2006.01) |
| *G01S 7/00* | (2006.01) |
| *H04W 4/029* | (2018.01) |

(52) U.S. Cl.
CPC ............. *G01S 13/89* (2013.01); *G01S 7/006* (2013.01); *H04W 4/029* (2018.02)

(58) Field of Classification Search
CPC ........ G01S 13/878; G01S 13/89; G01S 7/006; H04W 4/029
See application file for complete search history.

(56) References Cited

U.S. PATENT DOCUMENTS

| | | |
|---|---|---|
| 8,346,281 B2 | 1/2013 | Noonan et al. |
| 9,971,020 B1 | 5/2018 | Maher et al. |
| (Continued) | | |

OTHER PUBLICATIONS

Deng; "Polyphase Code Design for Orthogonal Netted Radar Systems" ; IEEE Transactions on Signal Processing; vol. 52, No. 11 (2004), pp. 31263135.

*Primary Examiner* — Timothy X Pham
(74) *Attorney, Agent, or Firm* — Greenberg Traurig, LLP; Mammen ("Roy") P. Zachariah

(57)     ABSTRACT

Radio frequency (RF)-based ranging and imaging in a wireless communications circuit, particularly for a wireless communications system (WCS) is provided. The wireless communications circuit includes an antenna circuit configured to radiate an RF probing signal in a number of directions in a wireless communications cell and receives a number of RF reflection signals corresponding to the RF probing signal. A radar signal processing (RSP) circuit is configured to process the RF reflection signals to detect an obstacle(s) in the wireless communications cell and generate a surrounding image that includes the detected obstacle(s). By generating the surrounding image of the wireless communications cell, it may be possible to detect the obstacle(s) that was not accounted for in an initial deployment design. As a result, it may be possible to adjust a remote unit(s) incorporating the wireless communications circuit to improve RF coverage, throughput, and/or capacity in the wireless communications cell.

19 Claims, 11 Drawing Sheets

(56)     References Cited

U.S. PATENT DOCUMENTS

| | | | |
|---|---|---|---|
| 2015/0038185 | A1 | 2/2015 | Saban et al. |
| 2015/0301172 | A1 | 10/2015 | Ossowska et al. |
| 2018/0076869 | A1 | 3/2018 | Aue et al. |
| 2018/0143311 | A1 | 5/2018 | Melamed et al. |
| 2019/0384318 | A1 | 12/2019 | Fuchs et al. |
| 2021/0208242 | A1 | 7/2021 | Sudarsan et al. |
| 2021/0229702 | A1 | 7/2021 | Tsuji et al. |

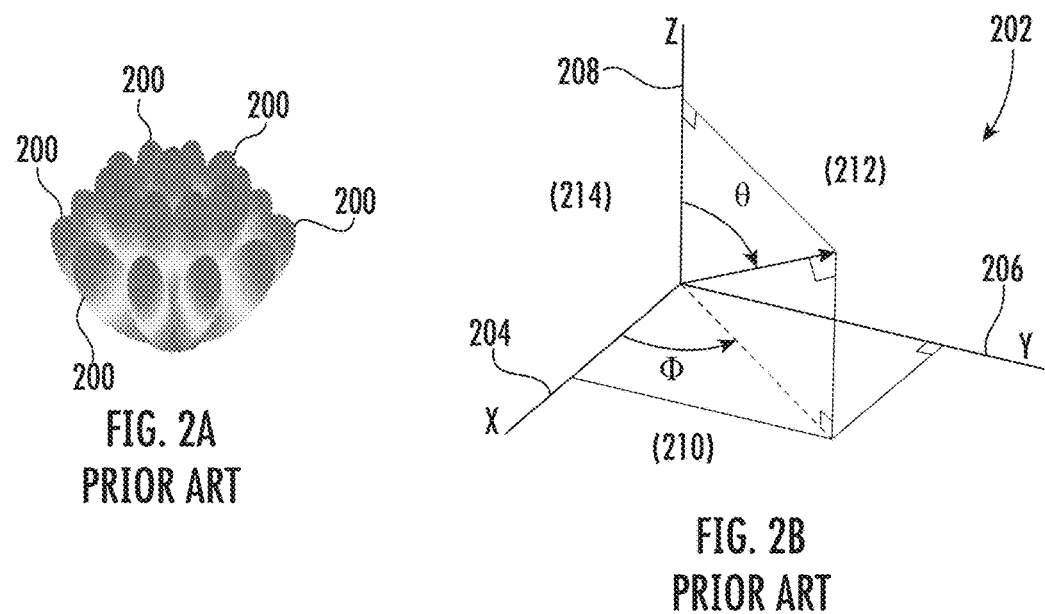
FIG. 2A
PRIOR ART
FIG. 2B
PRIOR ART
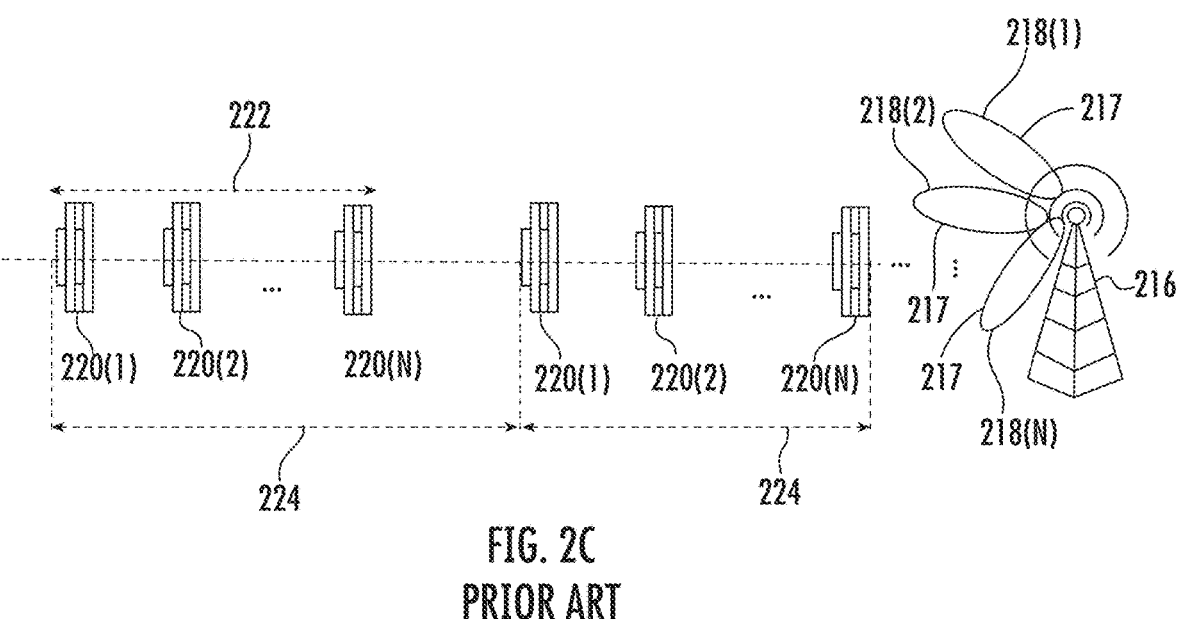
FIG. 2C
PRIOR ART

226

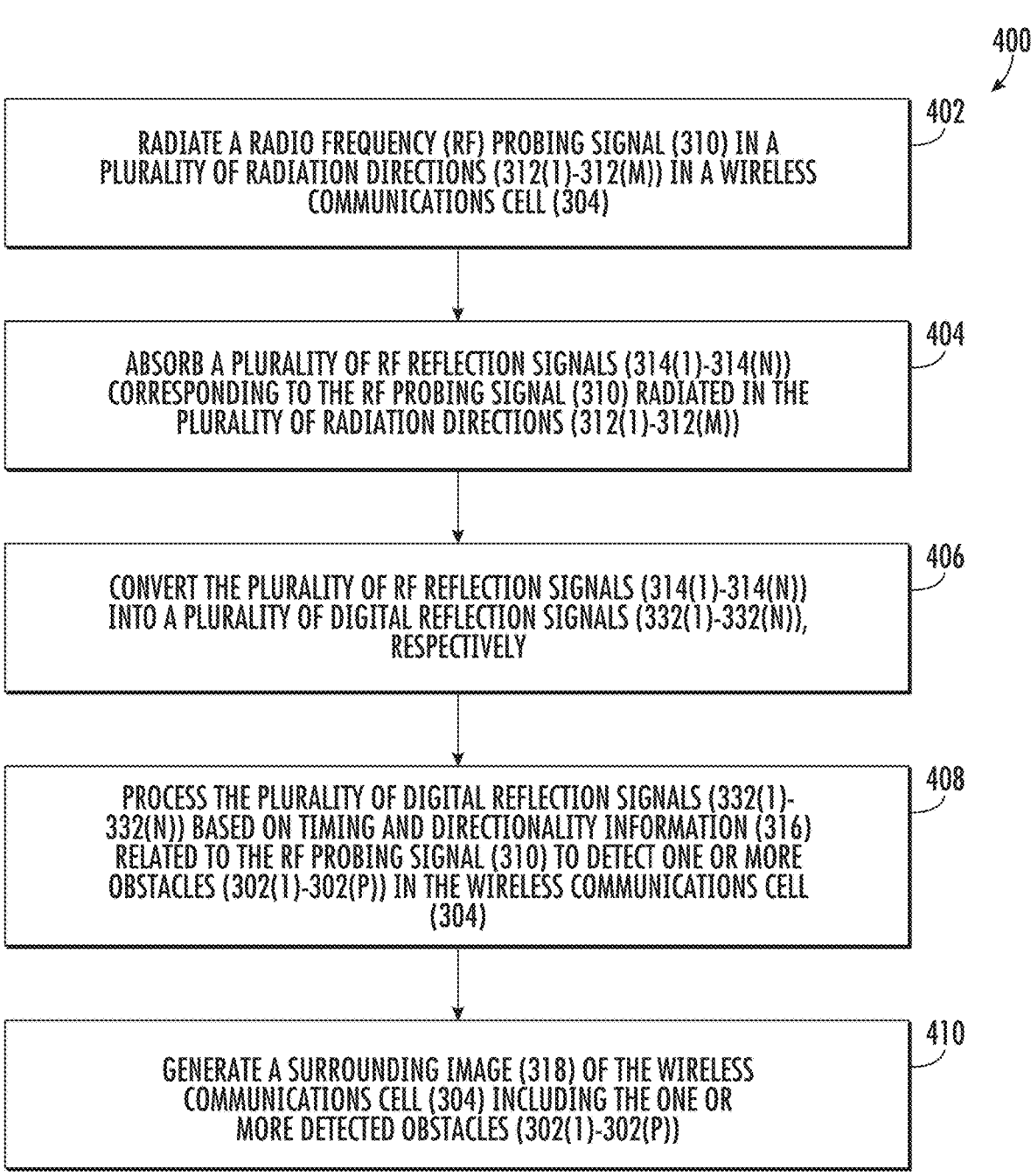

400

402
RADIATE A RADIO FREQUENCY (RF) PROBING SIGNAL (310) IN A PLURALITY OF RADIATION DIRECTIONS (312(1)-312(M)) IN A WIRELESS COMMUNICATIONS CELL (304)

404
ABSORB A PLURALITY OF RF REFLECTION SIGNALS (314(1)-314(N)) CORRESPONDING TO THE RF PROBING SIGNAL (310) RADIATED IN THE PLURALITY OF RADIATION DIRECTIONS (312(1)-312(M))

406
CONVERT THE PLURALITY OF RF REFLECTION SIGNALS (314(1)-314(N)) INTO A PLURALITY OF DIGITAL REFLECTION SIGNALS (332(1)-332(N)), RESPECTIVELY

408
PROCESS THE PLURALITY OF DIGITAL REFLECTION SIGNALS (332(1)-332(N)) BASED ON TIMING AND DIRECTIONALITY INFORMATION (316) RELATED TO THE RF PROBING SIGNAL (310) TO DETECT ONE OR MORE OBSTACLES (302(1)-302(P)) IN THE WIRELESS COMMUNICATIONS CELL (304)

410
GENERATE A SURROUNDING IMAGE (318) OF THE WIRELESS COMMUNICATIONS CELL (304) INCLUDING THE ONE OR MORE DETECTED OBSTACLES (302(1)-302(P))

FIG. 4

RADIO FREQUENCY (RF)-BASED RANGING AND IMAGING IN A WIRELESS COMMUNICATIONS CIRCUIT, PARTICULARLY FOR A WIRELESS COMMUNICATIONS SYSTEM (WCS)

PRIORITY APPLICATION

This application is a continuation of U.S. patent application Ser. No. 16/809,242 filed Mar. 4, 2020, the content of which is relied upon and incorporated herein by reference in its entirety.

BACKGROUND

The disclosure relates generally to a wireless communications apparatus(es), such as a remote unit(s), a remote radio head(s), or a mobile device(s), particularly in a wireless communications system (WCS), such as a distributed communications system (DCS), a small cell radio access network (RAN), or a distributed antenna system (DAS), configured to support radio frequency (RF)-based ranging and imaging.

Wireless customers are increasingly demanding wireless communications services, such as cellular communications services and Wireless Fidelity (Wi-Fi) services. Thus, small cells, and more recently Wi-Fi services, are being deployed indoors. At the same time, some wireless customers use their wireless communications devices in areas that are poorly serviced by conventional cellular networks, such as inside certain buildings or areas where there is little cellular coverage. One response to the intersection of these two concerns has been the use of DCSs as WCSs, such as a small cell RAN or DAS. DCSs include a central unit or node that is configured to transmit or distribute communications signals to remote units typically over physical medium, such as electrical conductors or optical fiber. The remote units are configured to receive and distribute such communications signals to client devices within the antenna range of the remote unit. DCSs can be particularly useful when deployed inside buildings or other indoor environments where the wireless communications devices may not otherwise be able to effectively receive RF signals from a source.

In this regard, FIG. 1 illustrates a WCS 100, such as a DCS, that is configured to distribute communications services to remote coverage areas 102(1)-102(N), where 'N' is the number of remote coverage areas. The WCS 100 in FIG. 1 is provided in the form of a wireless DCS, such as a DAS 104 in this example. The DAS 104 can be configured to support a variety of communications services that can include cellular communications services, wireless communications services, such as RF identification (RFID) tracking, Wi-Fi, local area network (LAN), and wireless LAN (WLAN), wireless solutions (Bluetooth, Wi-Fi Global Positioning System (GPS) signal-based, and others) for location-based services, and combinations thereof, as examples. The remote coverage areas 102(1)-102(N) are created by and centered on remote units 106(1)-106(N) connected to a central unit 108 (e.g., a head-end controller, a central unit, or a head-end unit). The central unit 108 may be communicatively coupled to a source transceiver 110, such as for example, a base transceiver station (BTS) or a baseband unit (BBU). In this regard, the central unit 108 receives downlink communications signals 112D from the source transceiver 110 to be distributed to the remote units 106(1)-106(N). The downlink communications signals 112D can include data communications signals and/or communications signaling signals, as examples. The central unit 108 is configured with filtering circuits and/or other signal processing circuits that are configured to support a specific number of communications services in a particular frequency bandwidth (i.e., frequency communications bands). The downlink communications signals 112D are communicated by the central unit 108 over a communications link 114 over their frequency to the remote units 106(1)-106(N).

With continuing reference to FIG. 1, the remote units 106(1)-106(N) are configured to receive the downlink communications signals 112D from the central unit 108 over the communications link 114. The downlink communications signals 112D are configured to be distributed to the respective remote coverage areas 102(1)-102(N) of the remote units 106(1)-106(N). The remote units 106(1)-106(N) are also configured with filters and other signal processing circuits that are configured to support all or a subset of the specific communications services (i.e., frequency communications bands) supported by the central unit 108. In a non-limiting example, the communications link 114 may be a wired communications link, a wireless communications link, or an optical fiber-based communications link. The remote units 106(1)-106(N) may include RF transmitter/receiver circuits 116(1)-116(N) and antennas 118(1)-118(N), respectively. The antennas 118(1)-118(N) are operably connected to the RF transmitter/receiver circuits 116(1)-116(N) to wirelessly distribute the communications services to user equipment (UE) 120 within the respective remote coverage areas 102(1)-102(N). In a non-limiting example, the UE 120 is a mobile equipment having an electrical circuit(s) and a radio interface(s) configured to enable user access to the WCS 100. The remote units 106(1)-106(N) are also configured to receive uplink communications signals 112U from the UE 120 in the respective remote coverage areas 102(1)-102(N) to be distributed to the source transceiver 110.

Conventionally, the remote units 106(1)-106(N) may be configured to communicate the downlink communications signals 112D and the uplink communications signals 112U with the UE 120 based on a third-generation (3G) wireless communication technology, such as wideband code-division multiple access (WCDMA), and/or a fourth-generation (4G) wireless communication technology, such as long-term evolution (LTE). As wireless communication technology continues to evolve, a new fifth-generation (5G) new-radio (NR) (5G-NR) wireless communication technology has emerged as a next generation wireless communication technology having the potential of achieving significant improvement in data throughput, coverage range, signal efficiency, and access latency over the existing 3G and 4G wireless communication technologies. As such, it may be necessary to upgrade or reconfigure the remote units 106(1)-106(N) to communicate the downlink communications signals 112D and the uplink communications signals 112U with the UE 120 based on the 5G-NR wireless communication technologies.

When the remote units 106(1)-106(N) are configured to operate based on the 3G or 4G wireless communication technologies, the downlink communications signals 112D and the uplink communications signals 112U are typically communicated in a RF spectrum below 6 GHz. As such, the antennas 118(1)-118(N) may be omnidirectional antennas that radiate the downlink communications signals 112D with equal RF power in all directions.

In contrast, the 5G-NR wireless communication technology may be implemented based on a millimeter-wave (mm-Wave) spectrum that is typically higher than 6 GHz, which makes the downlink communications signals 112D and the uplink communications signals 112U more susceptible to propagation loss. As such, RF beamforming has become a core ingredient of the 5G-NR wireless communication technology to help mitigate signal propagation loss in the mmWave spectrum. In this regard, the antennas 118(1)-118 (N) may be replaced by an equal number of antenna arrays (not shown) each including multiple antennas (e.g., 4×4, 8×8, 16×16, etc.). Accordingly, the remote units 106(1)-106 (N) may be configured to communicate the downlink communications signals 112D and the uplink communications signals 112U by forming and steering RF beams 122(1)-122 (N) toward the UE 120. By forming and steering the RF beams 122(1)-122(N) toward the UE 120, the remote units 106(1)-106(N) may communicate the downlink communications signals 112D and the uplink communications signals 112U with higher equivalent isotropically radiated power (EIRP) and signal-to-interference-plus-noise ratio (SINR), thus helping to mitigate the propagation loss in the mmWave spectrum.

When the WCS 100 is first deployed, designers may use third party software to create an initial RF design that provides recommended configurations for placement and setting of the remote units 106(1)-106(N). Once the RF design is complete, the WCS 100 may be so installed and configured to closely match the RF design. However, the initial RF design may have been created based on a set of general assumptions that fails to take into consideration physical obstacles (e.g., walls, office partitions, etc.) in a surrounding environment. As a result, the downlink communications signals 112D and/or the uplink communications signals 112U may suffer degraded EIRP and SINR due to propagation loss. As such, it may be desirable to equip the remote units 106(1)-106(N) with the ability to reassess the surrounding environment after being deployed in the WCS 100.

No admission is made that any reference cited herein constitutes prior art. Applicant expressly reserves the right to challenge the accuracy and pertinency of any cited documents.

SUMMARY

Embodiments disclosed herein include radio frequency (RF)-based ranging and imaging in a wireless communications circuit, particularly for a wireless communications system (WCS). In examples disclosed herein, the wireless communications circuit can be configured to reassess a surrounding environment to detect and identify an obstacle(s), which may have not been accounted for in an initial deployment design, after being deployed in a remote unit(s) based on the initial deployment design. More specifically, the wireless communications circuit includes an antenna circuit configured to radiate an RF probing signal in a number of directions in a wireless communications cell and receives a number of RF reflection signals corresponding to the RF probing signal. A radar signal processing (RSP) circuit is provided in the wireless communications circuit to process the RF reflection signals to detect an obstacle(s) in the wireless communications cell. Accordingly, the RSP circuit can generate a surrounding image of the wireless communications cell that includes the detected obstacle(s). By performing RF-based ranging and imaging to generate the surrounding image of the wireless communications cell, it may be possible to detect the obstacle(s) that was not accounted for in the initial deployment design. As a result, it may be possible to adjust (e.g., reposition) the remote unit(s) to improve RF coverage, throughput, and/or capacity in the wireless communications cell.

One exemplary embodiment of the disclosure relates to a wireless communications circuit. The wireless communications circuit includes an antenna circuit. The antenna circuit is configured to radiate an RF probing signal in a plurality of radiation directions in a wireless communications cell. The antenna circuit is also configured to absorb a plurality of RF reflection signals corresponding to the RF probing signal radiated in the plurality of radiation directions. The wireless communications circuit also includes an RF front-end circuit configured to convert the plurality of RF reflection signals into a plurality of digital reflection signals, respectively. The wireless communications circuit also includes an RSP circuit. The RSP circuit is configured to process the plurality of digital reflection signals based on timing and directionality information related to the RF probing signal to detect one or more obstacles in the wireless communications cell. The RSP circuit is also configured to generate a surrounding image of the wireless communications cell comprising the one or more detected obstacles.

An additional exemplary embodiment of the disclosure relates to a method for RF-based ranging and imaging in a wireless communications circuit. The method includes radiating an RF probing signal in a plurality of radiation directions in a wireless communications cell. The method also includes absorbing a plurality of RF reflection signals corresponding to the RF probing signal radiated in the plurality of radiation directions. The method also includes converting the plurality of RF reflection signals into a plurality of digital reflection signals, respectively. The method also includes processing the plurality of digital reflection signals based on timing and directionality information related to the RF probing signal to detect one or more obstacles in the wireless communications cell. The method also includes generating a surrounding image of the wireless communications cell comprising the one or more detected obstacles.

An additional exemplary embodiment of the disclosure relates to a WCS. The WCS includes a central unit. The WCS also includes a plurality of remote units coupled to the central unit via a plurality of communications mediums. At least one remote unit among the plurality of remote units includes a wireless communications circuit. The wireless communications circuit includes an antenna circuit. The antenna circuit is configured to radiate an RF probing signal in a plurality of radiation directions in a wireless communications cell. The antenna circuit is also configured to absorb a plurality of RF reflection signals corresponding to the RF probing signal radiated in the plurality of radiation directions. The wireless communications circuit also includes an RF front-end circuit configured to convert the plurality of RF reflection signals into a plurality of digital reflection signals, respectively. The wireless communications circuit also includes an RSP circuit. The RSP circuit is configured to process the plurality of digital reflection signals based on timing and directionality information related to the RF probing signal to detect one or more obstacles in the wireless communications cell. The RSP circuit is also configured to generate a surrounding image of the wireless communications cell comprising the one or more detected obstacles.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description to explain principles and operation of the various embodiments.

BRIEF DESCRIPTION OF THE DRAWINGS

FIGS. 2A-2C are graphic diagrams providing exemplary illustrations of a number of fundamental aspects related to radio frequency (RF) beamforming;

FIG. 4 is a flowchart of an exemplary process that can be employed by the wireless communications circuit of FIG. 3 to perform the RF-based ranging and imaging in the wireless communications cell;

DETAILED DESCRIPTION

Embodiments disclosed herein include radio frequency (RF)-based ranging and imaging in a wireless communications circuit, particularly for a wireless communications system (WCS). In examples disclosed herein, the wireless communications circuit can be configured to reassess a surrounding environment to detect and identify an obstacle(s), which may have not been accounted for in an initial deployment design, after being deployed in a remote unit(s) based on the initial deployment design. More specifically, the wireless communications circuit includes an antenna circuit configured to radiate an RF probing signal in a number of directions in a wireless communications cell and receives a number of RF reflection signals corresponding to the RF probing signal. A radar signal processing (RSP) circuit is provided in the wireless communications circuit to process the RF reflection signals to detect an obstacle(s) in the wireless communications cell. Accordingly, the RSP circuit can generate a surrounding image of the wireless communications cell that includes the detected obstacle(s). By performing RF-based ranging and imaging to generate the surrounding image of the wireless communications cell, it may be possible to detect the obstacle(s) that was not accounted for in the initial deployment design. As a result, it may be possible to adjust (e.g., reposition) the remote unit(s) to improve RF coverage, throughput, and/or capacity in the wireless communications cell.

Figure 1:
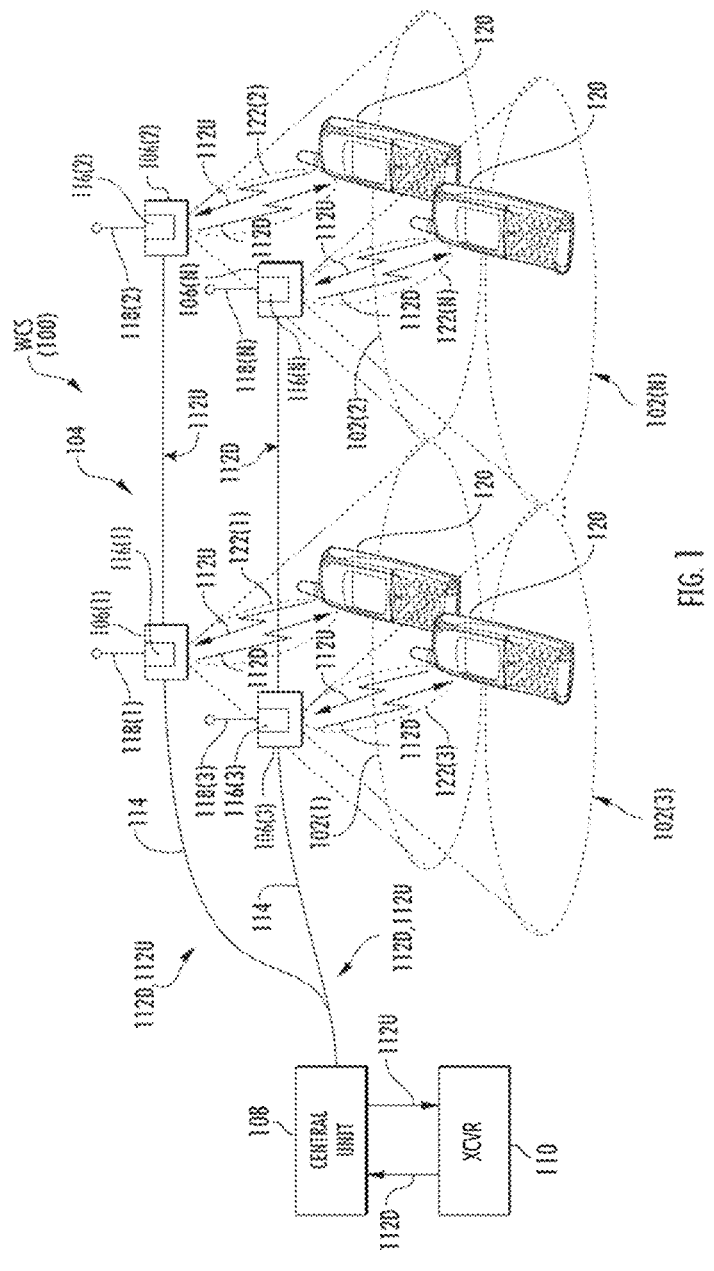
FIG. 1 is a schematic diagram of an exemplary wireless communications system (WCS), such as a distributed communications system (DCS), configured to distribute communications services to remote coverage areas.
Figure 2D:
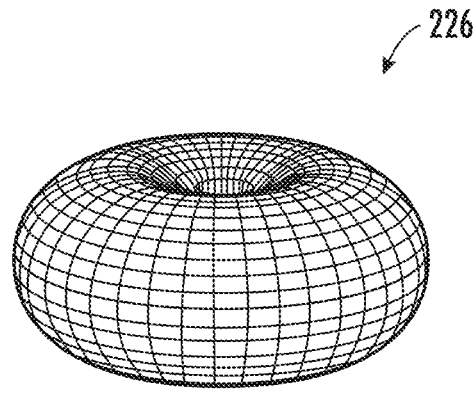
FIG. 2D is a graphic diagram providing an exemplary illustration of an omnidirectional radiation pattern.
Figure 3:
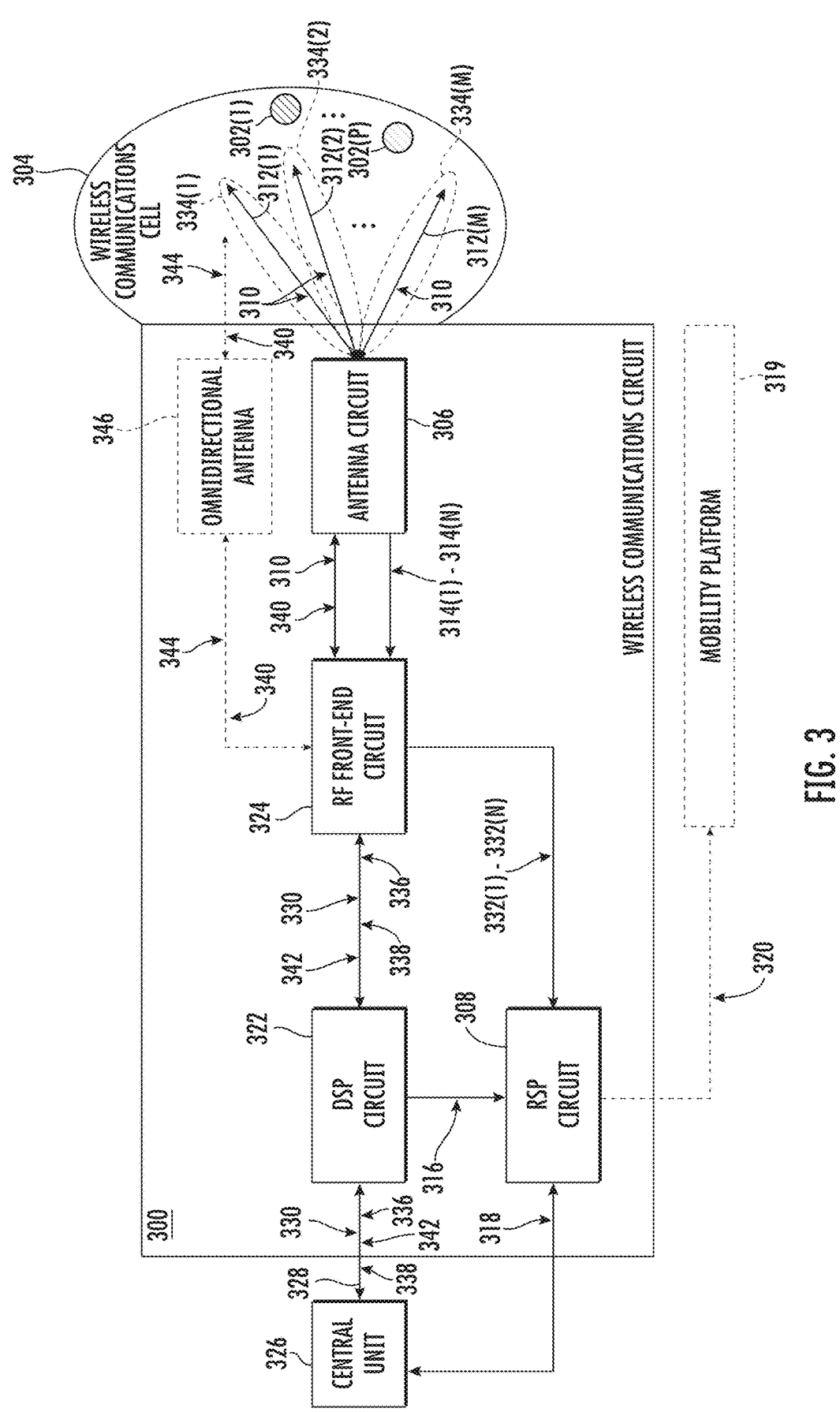
FIG. 3 is a schematic diagram of an wireless communications circuit configured to perform RF-based ranging and imaging to detect an obstacle(s) in a wireless communications cell.

Before discussing a wireless communications circuit of the present disclosure configured to detect an obstacle(s) in a wireless communications cell via RF-based ranging and imaging starting at FIG. 3, a brief overview is first provided with reference to FIGS. 2A-2D to help explain some fundamental aspects related to RF beamforming and omnidirection radiation.

FIGS. 2A-2C are graphic diagrams providing exemplary illustration of a number of fundamental aspects related to RF beamforming. In general, beamforming refers to a technique that uses multiple antennas to simultaneously radiate an RF signal in an RF spectrum, such as a millimeterwave (mm-Wave) spectrum. The multiple antennas, also called "antenna elements," that are typically organized into an antenna array (e.g., 4×4, 8×8, 16×16, etc.) and separated from each other by at least one-half (½) wavelength. The RF signal is pre-processed based on a beam weight set, which includes multiple beam weights corresponding to the multiple antennas, respectively, to generate multiple weighted RF signals. The multiple weighted RF signals are then coupled to specific antennas in the antenna array for simultaneous radiation in the RF spectrum. As illustrated in FIG. 2A, by pre-processing the RF signal based on multiple beam weight sets, it may be possible to form multiple RF beams 200 pointing to multiple directions radiating from antenna elements in an antenna array, respectively.

Each beam weight in a given beam weight set is a complex weight consisting of a respective phase term and a respective amplitude term. The phase terms in the complex beam weight can be determined to cause the multiple simultaneously radiated RF signals to constructively combine in one direction to form the RF beams 200, while destructively averaging out in other directions. In this regard, the phase term can determine how the RF beams 200 are formed and in which direction the RF beams 200 are pointing. On the other hand, the amplitude terms in the complex beam weight may determine how many of the antennas in the antenna array are utilized to simultaneously radiate the RF signals. Notably, when more antennas are utilized to simultaneously radiate the RF signals, the RF beams 200 will become more concentrated to have a narrower beamwidth and a higher beamformed antenna gain. In contrast, when fewer antennas are utilized to simultaneously radiate the RF signals, the RF beams 200 will become more spread out to have a wider beamwidth and a less beamformed antenna gain. In this regard, the amplitude term can determine the beamwidth of the RF beams 200.

FIG. 2B is a graphic diagram of an exemplary spherical coordinate system 202 that helps explain how the complex beam weight can be determined. The spherical coordinate system 202 includes an x-axis (X) 204, a y-axis (Y) 206, and a z-axis (Z) 208. The x-axis 204 and the y-axis 206 collectively define an x-y plane 210, the y-axis 206 and the z-axis 208 collectively define a y-z plane 212, and the x-axis 204 and the z-axis 208 collectively define an x-z plane 214. Depending how the multiple antennas are arranged in the antenna array, a beam weight $w_n$ may be determined based on equations (Eq. 1-Eq. 4) below.

The equation (Eq. 1) below illustrates how a beam weight $w_n$ may be determined when the multiple antennas in the antenna array are arranged linearly along the y-axis 206.

$$w_n = e^{-j2\pi n \cdot \frac{dy}{\lambda} \cdot \sin\theta} \quad (0 \le n \le N-1) \tag{Eq. 1}$$

In the equation (Eq. 1) above, 'N' represents a total number of the antennas in the antenna array, and $\theta$ represents a zenith angle. The equation (Eq. 2) below illustrates how a beam weight $w_{m,n}$ may be determined when the multiple antennas in the antenna array are arranged in an M×N matrix in the x-y plane 210 in FIG. 2B.

$$w_{m,n} = e^{-j2\pi m \cdot \frac{dx}{\lambda} \cdot \sin\theta\cos\phi} e^{-j2\pi n \cdot \frac{dy}{\lambda} \cdot \sin\theta\sin\phi} \quad (0 \le m \le M-1, 0 \le n \le N-1) \tag{Eq. 2}$$

In the equation (Eq. 2) above, 'M' and 'N' represent the number of rows and the number of columns of the M×N matrix, respectively, and $\phi$ represents an azimuth angle. The equation (Eq. 3) below illustrates how the beam weight $w_{m,n}$ may be determined when the multiple antennas in the antenna array are arranged in an M×N matrix in the y-z plane 212.

$$w_{m,n} = e^{-j2\pi m \cdot \frac{dz}{\lambda} \cdot \cos\theta} e^{-j2\pi n \cdot \frac{dy}{\lambda} \cdot \sin\theta\sin\phi} \quad (0 \le m \le M-1, 0 \le n \le N-1) \tag{Eq. 3}$$

The equation (Eq. 4) below illustrates how the beam weight $w_{m,n}$ may be determined when the multiple antennas in the antenna array are arranged in an M×N matrix in the x-z plane 214.

$$w_{m,n} = e^{-j2\pi m \cdot \frac{dx}{\lambda} \cdot \sin\theta\cos\phi} e^{-j2\pi n \cdot \frac{dz}{\lambda} \cdot \cos\theta} \quad (0 \le m \le M-1, 0 \le n \le N-1) \tag{Eq. 4}$$

Although it may be possible for the antennas in an antenna array to form the multiple RF beams 200 in FIG. 2A in the multiple directions, an actual number of the RF beams 200 is typically limited by a standard-defined parameter known as the synchronization signal block (SSB), which is further discussed next in FIG. 2C. In this regard, FIG. 2C is a graphic diagram providing an exemplary illustration on how the SSB limits the actual number the RF beams 200 that may be formed by the antennas in the antenna array.

In a fifth-generation new-radio (5G-NR) wireless system, a 5G-NR gNB 216 is configured to radiate a beam discovery signal 217 in a number of reference beams 218(1)-218(N) in different directions of a 5G-NR coverage cell. Herein, the beam discovery signal 217 is a reference signal containing synchronization and control information of the 5G-NR gNB 216. In this regard, a 5G-NR user equipment (UE) in the 5G-NR coverage cell can sweep through the reference beams 218(1)-218(N) to identify a candidate reference beam(s) associated with a strongest reference signal received power (RSRP). Further, the 5G-NR UE may decode a candidate SSB(s) associated with the identified candidate reference beam(s) to acquire synchronization with the 5G-NR gNB 216 and thereby obtain such control information as physical cell identification (PCI) and a PBCH demodulation reference signal (DMRS). Based on the candidate reference beam(s) reported by the 5G-NR UE, the 5G-NR gNB 216 may pinpoint a location of the 5G-NR UE and steer a data-bearing RF beam toward the 5G-NR UE to enable data communication with the 5G-NR UE.

The reference beams 218(1)-218(N) are associated with a number of SSBs 220(1)-220(N), respectively. The SSBs 220(1)-220(N) may be organized into an SSB burst set 222 to be repeated periodically in a number of SSB burst periods 224. The SSB burst set 222 may be five milliseconds (5 ms) in duration, and the SSB burst periods 224 may repeat every twenty milliseconds (20 ms). The beamforming standard, as presently defined by the third-generation partnership project (3GPP), allows a maximum of 64 SSBs to be scheduled in the SSB burst set 222. Accordingly, the 5G-NR gNB 216 can radiate 64 reference beams 218(1)-218(N) in each of the SSB burst periods 224.

Each of the SSBs 220(1)-220(N) may include a primary synchronization signal (PSS), a secondary synchronization signal (SSS), and a 5G-NR physical broadcast channel (PBCH). The respective PSS and SSS associated with each of the SSBs 220(1)-220(N) are configured to enable the 5G-NR UE to acquire synchronization with the particular SSB. Moreover, the PSS and the SSS in each of the SSBs 220(1)-220(N) are randomly generated and uncorrelated. In other words, the PSS and the SSS in one of the SSBs 220(1)-220(N) may be orthogonal to the PSS and the SSS in another one of the SSBs 220(1)-220(N). As such, the PSS and the SSS in one of the SSBs 220(1)-220(N) can be distinguished from the PSS and the SSS in another one of the SSBs 220(1)-220(N). In this regard, the beam discovery signal 217 radiated in association with the SSBs 220(1)-220(N) satisfy a radar autocorrelation requirement, which requires orthogonality and distinguishability between a number of radar signals, and thus can be used as the radar signals to detect an obstacle(s) surrounding the 5G-NR gNB 216.

In contrast, in conventional wireless systems, such as the third-generation (3G) and the fourth-generation (4G) wireless systems, a cellular base station is typically configured to radiate a cell-wide reference signal omnidirectionally to enable cell discovery and coverage measurement by a UE. In this regard, FIG. 2D is a graphic diagram providing an exemplary illustration of an omnidirectional radiation pattern 226.

In the 3G or 4G wireless system, the cellular base station typically employs an omnidirectional antenna(s) to radiate the cell-wide reference signal with equal RF power in all directions perpendicular to an axis (e.g., azimuthal direction) with power varying with angle to the axis (e.g., elevation angle). As the cell-wide reference signal can be radiated with identical preamble in all directions, it may be difficult to distinguish the cell-wide reference signal radiated in one direction from the cell-wide reference signal radiated in another direction. Accordingly, the cell-wide reference signal in the 3G and 4G wireless systems may not be suited for detecting the obstacle(s) surrounding the cellular base station.

A WCS can include a number of remote units configured to provide 3G, 4G, and/or 5G wireless communications services in an indoor environment. Understandably, the remote units in the WCS can have different wireless communication capabilities or be purposely configured to provide certain types of wireless communication services. For example, some remote units may be configured to exclusively provide 3G and 4G wireless communication services, while some other remote units are configured to provide 3G, 4G, and 5G-NR wireless communication services. Hence, it may be desirable to equip each remote unit in the WCS with the capability of dynamically reassessing the surrounding environment after installation, regardless of the type of wireless communication services the remote unit is configured to provide.

In this regard, FIG. 3 is a schematic diagram of a wireless communications circuit 300 configured to perform RF-based ranging and imaging to detect one or more obstacles 302(1)-302(P) in a wireless communications cell 304. In examples disclosed herein, the wireless communications circuit 300 includes an antenna circuit 306 and an RSP circuit 308. In a non-limiting example, the RSP circuit 308 can include a specialized processor, such as a field-programmable gate array (FPGA), with machine-learning capabilities. The antenna circuit 306 can be configured to radiate an RF probing signal 310 in a plurality of radiation directions 312(1)-312(M) in the wireless communications cell 304. Notably, some or all of the RF probing signal 310 radiated in the radiation directions 312(1)-312(M) may hit some or all of the obstacle(s) 302(1)-302(P) and be reflected back toward the antenna circuit 306. As a result, the antenna circuit 306 may also absorb a plurality of RF reflection signals 314(1)-314(N) that correspond to the RF probing signal 310. As discussed in detail below, the RSP circuit 308 is configured to detect the obstacles 302(1)-302(P) based on timing and directionality information 316 related to the RF probing signal 310. Accordingly, the RSP circuit 308 can generate a surrounding image 318 of the wireless communications cell 304 that includes the detected obstacles 302(1)-302(P).

Notably, the wireless communications circuit 300 may have been installed in a remote unit based on an initial RF design to provide wireless communications services in the wireless communications cell 304, and the initial RF design may have not accounted for some or all of the detected obstacles 302(1)-302(P). In this regard, by performing RF-based ranging and imaging to dynamically generate the surrounding image 318 that includes the detected obstacles 302(1)-302(P), it may be possible to adjust (e.g., reposition) the remote unit to improve RF coverage, throughput, and/or capacity in the wireless communications cell 304.

Herein, the surrounding image 318 can be a two-dimensional (2D) or a three-dimensional (3D) graphical presentation of an environment surrounding the antenna circuit 306. The surrounding image 318 may indicate respective coordinates of each of the detected obstacles 302(1)-302(P).

The surrounding image 318 may also indicate respective distance from the antenna circuit 306 to each of the detected obstacles 302(1)-302(P). The surrounding image 318 may further indicate respective azimuthal direction and elevation angle of each of the detected obstacles 302(1)-302(P) relative to the antenna circuit 306.

The wireless communications circuit 300 may be mounted on a mobility platform 319. In a non-limiting example, the mobility platform 319 can be an on-field trolley, a roof mounted servo-platform, or a drone. In this regard, the RSP circuit 308 may generate a mobility control signal 320 based on the surrounding image 318 to cause the mobility platform 319 to be repositioned in the wireless communications cell 304. For example, the RSP circuit 308 can determine an updated position (e.g., coordinates) based on the surrounding image 318 and command the mobility platform 319 to reposition the wireless communications circuit 300 from a present position (e.g., coordinates) to the updated position. As a result, it may be possible to optimize RF coverage in the wireless communications cell 304 to help improve capacity and throughput in the wireless communications cell 304.

The wireless communications circuit 300 can be configured to include a digital signal processing (DSP) circuit 322 and an RF front-end circuit 324. The DSP circuit 322 may be coupled to a central unit 326 via a communications medium 328, such as an optical fiber-based communications medium. In a non-limiting example, the DSP circuit 322 is configured to receive a digital signal 330 from the central unit 326. The RF front-end circuit 324 is configured to convert the digital signal 330 into the RF probing signal 310 for transmission in accordance to the timing and directionality information 316.

The antenna circuit 306 is configured to radiate the RF probing signal 310 in the radiation directions 312(1)-312(M) and absorb the RF reflection signals 314(1)-314(N) corresponding to the RF probing signal 310. Given that each of the RF reflection signals 314(1)-314(N) is a replica of the RF probing signal 310, the RF reflection signals 314(1)-314(N) would include the same timing and directionality information 316 as in the RF probing signal 310. The RF front-end circuit 324 is configured to receive the RF reflection signals 314(1)-314(N) from the antenna circuit 306 and convert the RF reflection signals 314(1)-314(N) into a plurality of digital reflection signals 332(1)-332(N), respectively. Understandably, the digital reflection signals 332(1)-332(N) would also include the same timing and directionality information 316 as in the RF probing signal 310. Accordingly, the RSP circuit 308 may process the digital reflection signals 332(1)-332(N) based on the timing and directionality information 316 to detect the obstacles 302(1)-302(P) and generate the surrounding image 318 to include the detected obstacles 302(1)-302(P).

The wireless communications circuit 300 may be configured to perform RF-based ranging and imaging to generate the surrounding image 318 including the obstacles 302(1)-302(P) based on a process. In this regard, FIG. 4 is a flowchart of an exemplary process 400 that can be employed by the wireless communications circuit 300 of FIG. 3 to perform the RF-based ranging and imaging in the wireless communications cell 304.

The wireless communications circuit 300 can be configured to radiate the RF probing signal 310 in the radiation directions 312(1)-312(M) in the wireless communications cell 304 (block 402). The wireless communications circuit 300 can also be configured to absorb the RF reflection signals 314(1)-314(N) corresponding to the RF probing signal 310 in the radiation directions 312(1)-312(M) (block 404). The wireless communications circuit 300 can also be configured to convert the RF reflection signals 314(1)-314 (N) to the digital reflection signals 332(1)-332(N), respectively (block 406). The wireless communications circuit 300 can also be configured to process the digital reflection signals 332(1)-332(N) based on the timing and directionality information 316 to detect the obstacles 302(1)-302(P) in the wireless communications cell 304 (block 408). The wireless communications circuit 300 can also be configured to generate the surrounding image 318 of the wireless communications cell 304 including the detected obstacles 302(1)-302 (P) (block 410).

With reference back to FIG. 3, the DSP circuit 322 may be configured to extract the timing and directionality information 316 from the digital signal 330 and provide the timing and directionality information 316 to the RSP circuit 308. The timing and directionality information 316 may include such timing information as a timestamp indicative of a generation time of the digital signal 330, which may be used to determine the respective distance from the antenna circuit 306 to each of the detected obstacles 302(1)-302(P). The timing and directionality information 316 may also include such directionality information as respective zenith and azimuth angles of the radiation directions 312(1)-312 (M), which can be used to determine the respective azimuthal direction and elevation angle of each of the detected obstacles 302(1)-302(P) relative to the antenna circuit 306.

The RSP circuit 308 is configured to receive the timing and directionality information 316 and the digital reflection signals 332(1)-332(N). Accordingly, the RSP circuit 308 can process the digital reflection signals 332(1)-332(N) based on the timing and directionality information 316 to generate the surrounding image 318 of the wireless communications cell 304. The RSP circuit 308 may be configured to process the digital reflection signals 332(1)-332(N) using any known and suitable process and/or algorithm to generate the surrounding image 318. The RSP circuit 308 may be configured to communicate the surrounding image 318 to the central unit 326 for further processing.

Given that the RF probing signal 310 may be radiated in an indoor environment, the RF probing signal 310 radiated in each of the radiation directions 312(1)-312(M) can be bounced back to the antenna circuit 306 via multiple reflection paths. As a result, a number of the RF reflection signals 314(1)-314(N) may generally be larger than a number of the radiation directions 312(1)-312(M) (N≥M). Accordingly, a number of the digital reflection signals 332(1)-332(N) may also be larger than the number of the RF radiation directions 312(1)-312(M). As such, prior to processing the digital reflection signals 332(1)-332(N), the RSP circuit 308 may be configured to screen the digital reflection signals 332(1)-332(N) prior to determining and eliminating one or more redundant digital reflection signals among the digital reflection signals 332(1)-332(N) that correspond to one or more multi-pathed RF reflection signals among the RF reflection signals 314(1)-314(N).

The RSP circuit 308 may be configured to determine and eliminate the redundant digital reflection signals based on any known and suitable algorithms. In one example, the RSP circuit 308 may eliminate those digital reflection signals having respective propagation durations longer than a predetermined threshold. In another example, the RSP circuit 308 may first determine a number of redundant digital reflection signals corresponding to a same radiation direction among the radiation directions 312(1)-312(M). Subsequently, the RSP circuit 308 may keep only the digital reflection signal having the shortest propagation duration among the redundant digital reflection signals. In a non-limiting example, the RSP circuit 308 may process the digital reflection signals 332(1)-332(N) for a predefined number iterations to help improve accuracy of the surrounding image 318.

After generating the surrounding image 318 that includes the detected obstacles 302(1)-302(P), the RSP circuit 308 may be further configured to identify the detected obstacles 302(1)-302(P) in the surrounding image 318. For example, the RSP circuit 308 can utilize any suitable machine-learning algorithm to help identify whether the detected obstacles 302(1)-302(P) are temporary obstacles (e.g., human beings) or permanent obstacles (e.g., ceilings, walls, hallways, office partitions, etc.). Accordingly, the RSP circuit 308 may determine the updated position to account only for the permanent obstacles and command the mobility platform 319 to reposition the wireless communications circuit 300 from the present position to the updated position.

In one non-limiting example, the wireless communications circuit 300 is a 5G-capable wireless communications circuit capable of communicating wireless communications signals via RF beamforming. In this regard, the antenna circuit 306 can be an antenna array configured to form a plurality of RF beams 334(1)-334(M) for radiating the RF probing signal 310 in the radiation directions 312(1)-312 (M), respectively.

As previously discussed in FIG. 2C, the beam discovery signal 217 radiated in association with the SSBs 220(1)-220 (N) by the 5G-NR gNB 216 can satisfy the radar autocorrelation requirement. As such, the antenna circuit 306 can be configured to radiate a beam discovery signal, such as the beam discovery signal 217, as the RF probing signal 310. In this regard, the DSP circuit 322 may receive the digital signal 330 that includes a digital beam discovery signal 336. The RF front-end circuit 324 converts the digital beam discovery signal 336 into the RF probing signal 310. Accordingly, the antenna circuit 306 forms the RF beams 334(1)-334(M) to radiate the RF probing signal 310, which is generated from the digital beam discovery signal 336, in the radiation directions 312(1)-312(M), respectively. Notably, each of the RF beams 334(1)-334(M) correspond to a respective PSS and SSS that can make the RF beams 334(1)-334(M) uniquely distinguishable to satisfy the radar autocorrelation requirement.

The DSP circuit 322 can also receive the digital signal 330 that further includes a downlink digital communications signal 338. In this regard, alternative to converting the digital beam discovery signal 336 into the RF probing signal 310, the RF front-end circuit 324 may also be configured to convert the downlink digital communications signal 338 into the RF probing signal 310. Accordingly, the antenna circuit 306 forms the RF beams 334(1)-334(M) to radiate the RF probing signal 310, which is generated from the downlink digital communications signal 338, in the radiation directions 312(1)-312(M), respectively. Notably, each of the RF beams 334(1)-334(M) correspond to a respective PSS and SSS that can make the RF beams 334(1)-334(M) uniquely distinguishable to satisfy the radar autocorrelation requirement.

The antenna circuit 306 can also absorb an uplink RF communications signal 340 in the wireless communications cell 304. Accordingly, the RF front-end circuit 324 converts the uplink RF communications signal 340 into an uplink digital communications signal 342. The DSP circuit 322 receives the uplink digital communications signal 342 and provides the uplink digital communications signal 342 to the central unit 326.

In another non-limiting example, the wireless communications circuit 300 is a 4G wireless communications circuit incapable of communicating wireless communications signals via RF beamforming. As such, the antenna circuit 306 is a directional antenna dedicated to radiating the RF probing signal 310 in the radiation directions 312(1)-312(M), respectively. Herein, a direction antenna is type of antenna that can be controlled to radiate or absorb more RF power in a specific direction than in other directions. Notably, the RF probing signal 310 is radiated with a respective preamble in each of the radiation directions 312(1)-312(M) to satisfy the radar autocorrelation requirement.

The wireless communications circuit 300 may include an omnidirectional antenna 346, and the RF front-end circuit 324 converts the downlink digital communications signal 338 into a downlink RF communications signal 344 for radiation in the wireless communications cell 304 via the omnidirectional antenna 346. The omnidirectional antenna 346 is also configured to absorb the uplink RF communications signal 340.

Figure 5:
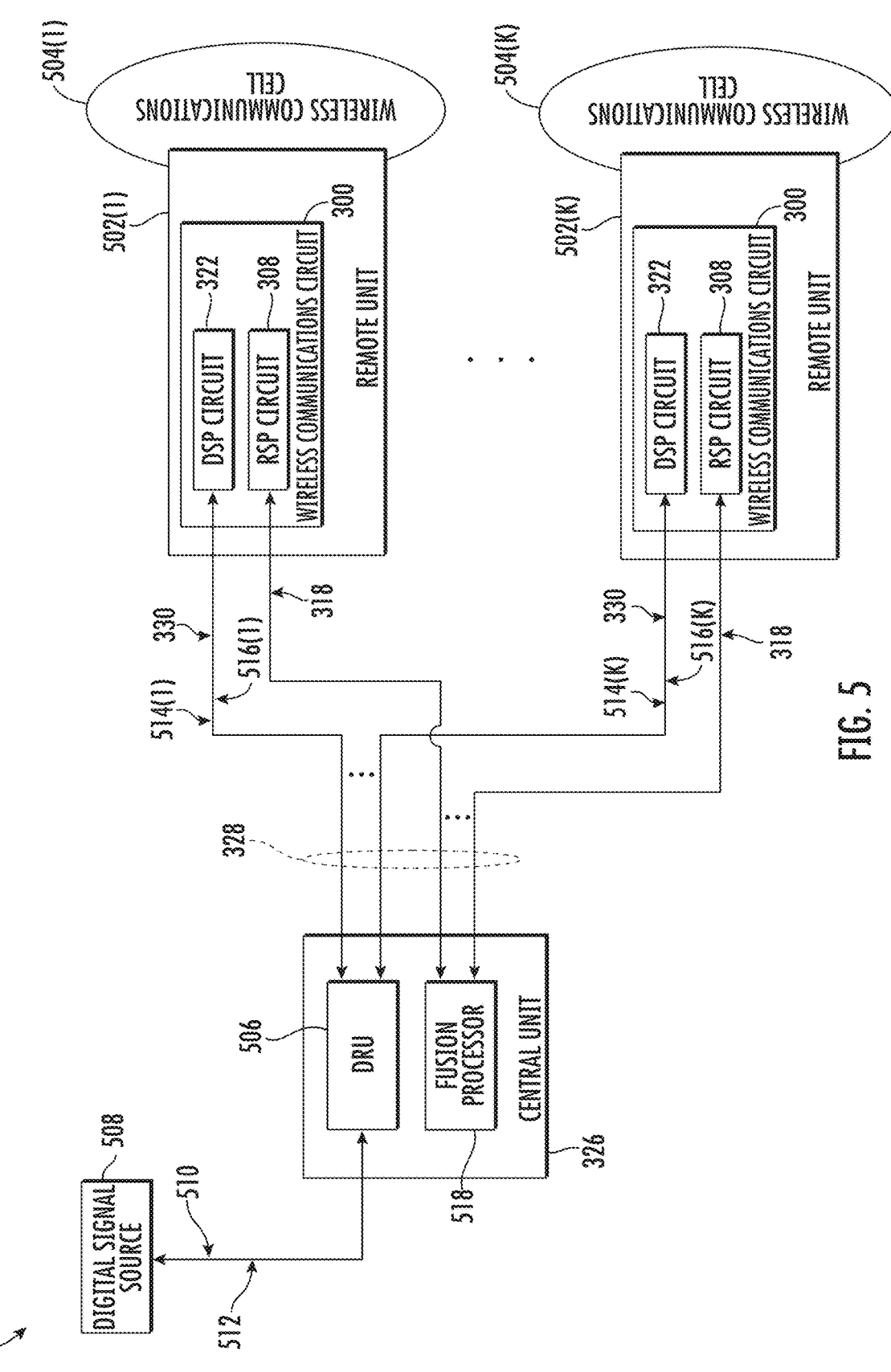
FIG. 5 is a schematic diagram of an exemplary WCS including a remote unit(s) that incorporates the wireless communications circuit of FIG. 3 to perform RF-based ranging and imaging in a wireless communications cell(s)

The wireless communications circuit 300 can be provided in a number of remote units in a WCS to perform RF-based ranging and imaging to improve RF coverage, capacity, and throughput of the entire WCS. In this regard, FIG. 5 is a schematic diagram of an exemplary WCS 500 including a plurality of remote units 502(1)-502(K) that incorporate the wireless communications circuit 300 of FIG. 3 to perform RF-based ranging and imaging in a plurality of wireless communications cells 504(1)-504(K). Common elements between FIGS. 3 and 5 are shown therein with common element numbers and will not be re-described herein.

The central unit 326 includes a digital routing unit (DRU) 506. The DRU 506 is coupled to a digital signal source 508, which can be a digital baseband (DBB) unit, as an example. The DRU 506 may receive a downlink digital baseband signal 510 from the digital signal source 508 and provide an uplink digital baseband signal 512 to the digital signal source 508. The DRU 506 may be configured to generate a plurality of downlink digital communications signals 514 (1)-514(K) based on the downlink digital baseband signal 510 and provide the downlink digital communications signals 514(1)-514(K) to the remote units 502(1)-502(K), respectively. The DRU 506 also receives a plurality of uplink digital communications signals 516(1)-516(K) from the remote units 502(1)-502(K), respectively. Accordingly, the DRU 506 generates the uplink digital baseband signal 512 based on the uplink digital communications signals 516(1)-516(K).

Each of the remote units 502(1)-502(K) can be configured to include the wireless communications circuit 300 to perform RF-based ranging and imaging in the wireless communications cells 504(1)-504(K). In this regard, the DRU 506 is configured to generate and provide the digital signal 330 to the remote units 502(1)-502(K) to enable the RF-based ranging and imaging in the wireless communications cells 504(1)-504(K). According to previous discussions in FIG. 3, the digital signal 330 may be a beam discovery signal or any one of the downlink digital communications signals 514(1)-514(K) for a 5G-capable remote unit(s) among the remote units 502(1)-502(K). In contrast, the digital signal 330 is different from any of the downlink digital communications signals 514(1)-514(K) for a non-5G-capable remote unit(s) among the remote units 502(1)-502(K).

The central unit 326 may include a fusion processor 518, which can be a system-on-chip (SoC) having general computing, graphic processing, and machine learning capabilities. In this regard, the fusion processor 518 can be a combination of a central processing unit (CPU), a graphic processing unit (GPU), and an artificial intelligence (AI) processing unit.

The wireless communications circuit 300 in each of the remote units 502(1)-502(K) is configured to perform RF-based ranging and imaging to generate a respective surrounding image 318. In one embodiment, the wireless communications circuit 300 in each of the remote units 502(1)-502(K) can provide the respective surrounding image 318 to the fusion processor 518. Accordingly, the fusion processor 518 may further process the respective surrounding image 318 received from each of the remote units 502(1)-502(K) to generate an environmental map for the WCS 500. The fusion processor 518 may provide the environmental map to the remote units 502(1)-502(K) and/or upload the environmental map to an internet-based platform (e.g., a mobile application).

In an alternative embodiment, the wireless communications circuit 300 in each of the remote units 502(1)-502(K) can offload the task of generating the respective surrounding image 318 to the fusion processor 518. In this regard, the wireless communications circuit 300 in each of the remote units 502(1)-502(K) can be configured to provide the respective detected obstacles 302(1)-302(P) (as shown in FIG. 3) to the fusion processor 518. The fusion processor 518, in turn, generates the respective surrounding image 318 for each of the wireless communications cells 504(1)-504(K) as well as the environmental map.

Figure 6:
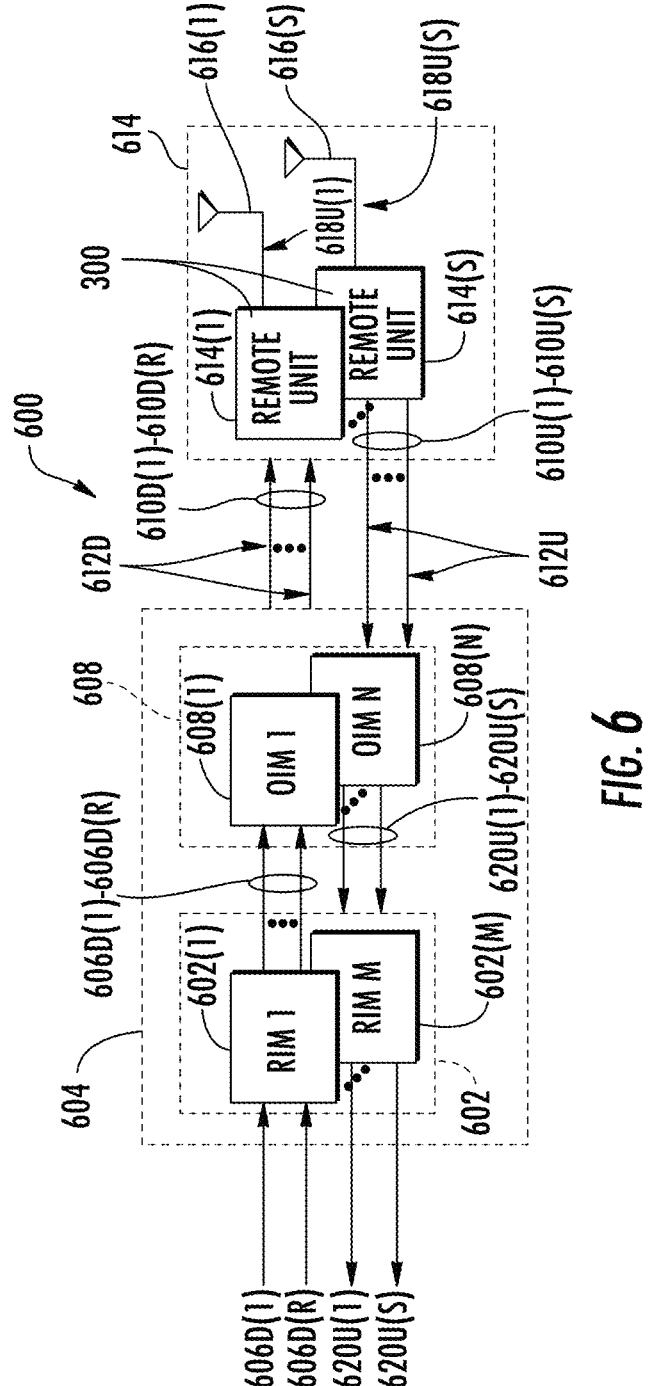
FIG. 6 is a schematic diagram of an exemplary WCS provided in the form of an optical fiber-based WCS that is configured to include the wireless communications circuit of FIG. 3 to perform RF-based ranging and imaging in the wireless communications cell.

FIG. 6 is a schematic diagram of an exemplary WCS 600 provided in the form of an optical fiber-based WCS 600 that can include a plurality of remote units, which can incorporate the wireless communications circuit 300 of FIG. 3 to perform RF-based ranging and imaging in the wireless communications cells 304. The WCS 600 includes an optical fiber for distributing communications services for multiple frequency bands. The WCS 600 in this example is comprised of three (3) main components. A plurality of radio interfaces provided in the form of radio interface modules (RIMS) 602(1)-602(M) are provided in a central unit 604 to receive and process a plurality of downlink digital communications signals 606D(1)-606D(R) prior to optical conversion into downlink optical fiber-based communications signals. The downlink digital communications signals 606D (1)-606D(R) may be received from a base station or a baseband unit as an example. The RIMs 602(1)-602(M) provide both downlink and uplink interfaces for signal processing. The notations "1-R" and "1-M" indicate that any number of the referenced component, 1-R and 1-M, respectively, may be provided. The central unit 604 is configured to accept the RIMS 602(1)-602(M) as modular components that can easily be installed and removed or replaced in the central unit 604. In one example, the central unit 604 is configured to support up to twelve (12) RIMs 602(1)-602 (12). Each of the RIMS 602(1)-602(M) can be designed to support a particular type of radio source or range of radio sources (i.e., frequencies) to provide flexibility in configuring the central unit 604 and the WCS 600 to support the desired radio sources.

For example, one RIM 602 may be configured to support the Personalized Communications System (PCS) radio band. Another RIM 602 may be configured to support the 800 megahertz (MHz) radio band. In this example, by inclusion of the RIMS 602(1)-602(M), the central unit 604 could be configured to support and distribute communications signals on both PCS and Long-Term Evolution (LTE) 700 radio bands, as an example. The RIMs 602(1)-602(M) may be provided in the central unit 604 that support any frequency bands desired, including, but not limited to, the US Cellular band, PCS band, Advanced Wireless Service (AWS) band, 700 MHz band, Global System for Mobile communications (GSM) 900, GSM 1800, and Universal Mobile Telecommunications System (UMTS). The RIMs 602(1)-602(M) may also be provided in the central unit 604 that support any wireless technologies desired, including but not limited to Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), LTE, iDEN, and Cellular Digital Packet Data (CDPD).

The RIMs 602(1)-602(M) may be provided in the central unit 604 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 6, the downlink digital communications signals 606D(1)-606D(R) are provided to a plurality of optical interfaces provided in the form of optical interface modules (OIMs) 608(1)-608(N) in this embodiment to convert the downlink digital communications signals 606D(1)-606D(R) into a plurality of downlink optical fiber-based communications signals 610D(1)-610D(R). The notation "1-N" indicates that any number of the referenced component 1-N may be provided. The OIMs 608(1)-608(N) may be configured to provide a plurality of optical interface components (OICs) that contain optical-to-electrical (O/E) and electrical-to-optical (E/O) converters, as will be described in more detail below. The OIMs 608(1)-608(N) support the radio bands that can be provided by the RIMs 602(1)-602(M), including the examples previously described above.

The OIMs 608(1)-608(N) each include E/O converters to convert the downlink digital communications signals 606D(1)-606D(R) into the downlink optical fiber-based communications signals 610D(1)-610D(R). The downlink optical fiber-based communications signals 610D(1)-610D(R) are communicated over a downlink optical fiber-based communications medium 612D to a plurality of remote units 614(1)-614(S). At least one selected remote unit among the remote units 614(1)-614(S) can be configured to include the wireless communications circuit 300 of FIG. 3. The notation "1-S" indicates that any number of the referenced component 1-S may be provided. Remote unit O/E converters provided in the remote units 614(1)-614(S) convert the downlink optical fiber-based communications signals 610D

(1)-610D(R) back into the downlink digital communications signals 606D(1)-606D(R), which are the converted into a plurality of downlink RF communications signals and provided to antennas 616(1)-616(S) in the remote units 614(1)-614(S) to client devices in the reception range of the antennas 616(1)-616(S).

The remote units 614(1)-614(S) receive a plurality of uplink RF communications signals 618U(1)-618U(S) from the client devices through the antennas 616(1)-616(S). The remote units 614(1)-614(S) convert the uplink RF communications signals 618U(1)-618U(S) into a plurality of uplink digital communications signals 618U(1)-618U(S). Remote unit E/O converters are also provided in the remote units 614(1)-614(S) to convert the uplink digital communications signals 618U(1)-618U(S) into a plurality of uplink optical fiber-based communications signals 610U(1)-610U(S). The remote units 614(1)-614(S) communicate the uplink optical fiber-based communications signals 610U(1)-610U(S) over an uplink optical fiber-based communications medium 612U to the OIMs 608(1)-608(N) in the central unit 604. The OIMs 608(1)-608(N) include O/E converters that convert the received uplink optical fiber-based communications signals 610U(1)-610U(S) into a plurality of uplink digital communications signals 620U(1)-620U(S), which are processed by the RIMS 602(1)-602(M) and provided as the uplink digital communications signals 620U(1)-620U(S). The central unit 604 may provide the uplink digital communications signals 620U(1)-620U(S) to a base station or other communications system.

Note that the downlink optical fiber-based communications medium 612D and the uplink optical fiber-based communications medium 612U connected to each of the remote units 614(1)-614(S) may be a common optical fiber-based communications medium, wherein for example, wave division multiplexing (WDM) is employed to provide the downlink optical fiber-based communications signals 610D(1)-610D(R) and the uplink optical fiber-based communications signals 610U(1)-610U(S) on the same optical fiber-based communications medium.

Figure 7:
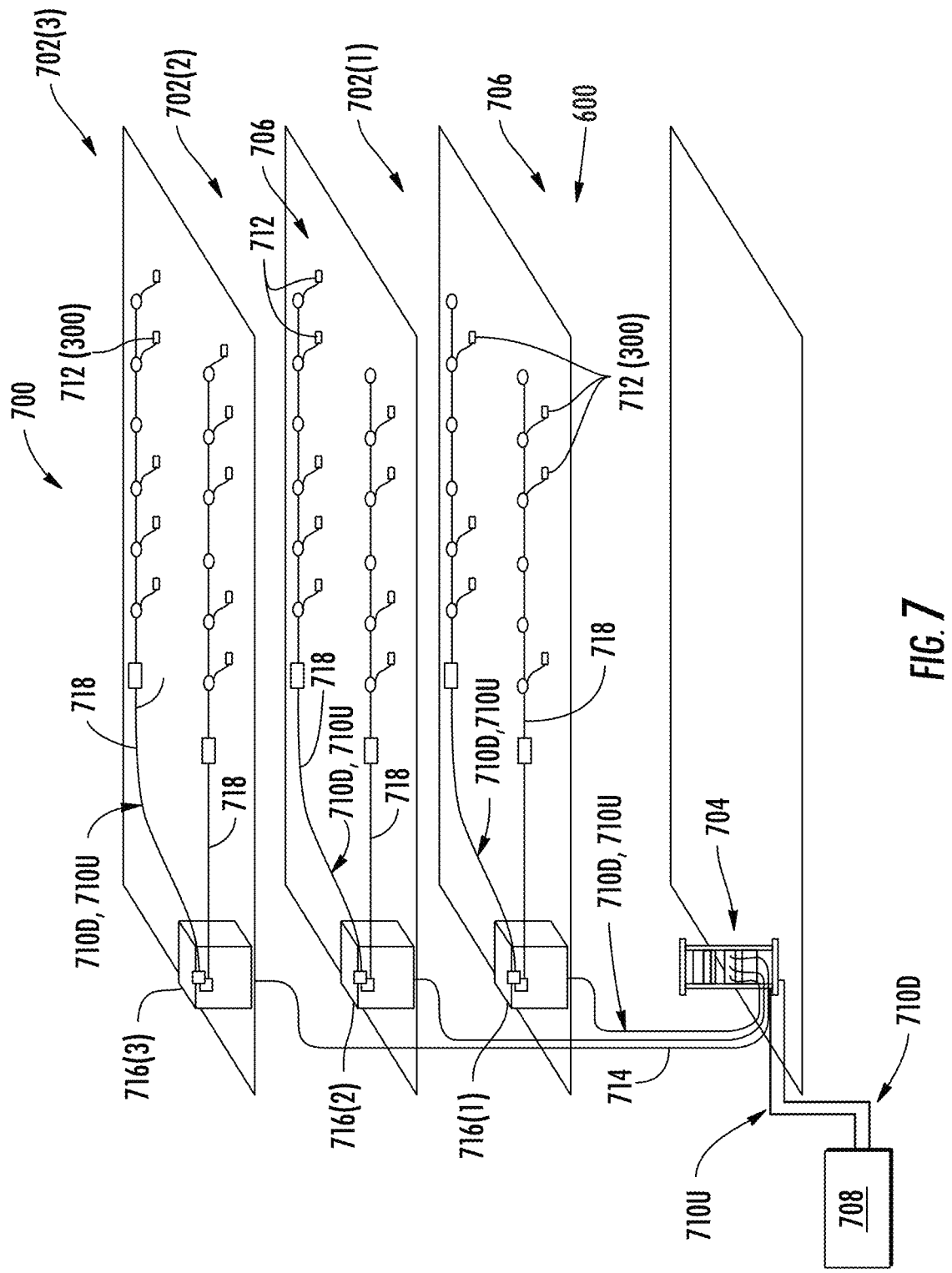
FIG. 7 is a schematic diagram of an exemplary building infrastructure with a deployed DCS, such as the optical fiber-based WCS in FIG. 6.

The WCS 600 in FIG. 6 can be provided in an indoor environment as illustrated in FIG. 7. FIG. 7 is a partial schematic cut-away diagram of an exemplary building infrastructure 700 incorporating the WCS 600 of FIG. 6. The building infrastructure 700 in this embodiment includes a first (ground) floor 702(1), a second floor 702(2), and a third floor 702(3). The floors 702(1)-702(3) are serviced by a central unit 704 to provide antenna coverage areas 706 in the building infrastructure 700. The central unit 704 is communicatively coupled to a base station 708 to receive downlink communications signals 710D from the base station 708. The central unit 704 is communicatively coupled to a plurality of remote units 712 to distribute the downlink communications signals 710D to the remote units 712 and to receive uplink communications signals 710U from the remote units 712, as previously discussed above. In a non-limiting example, any of the remote units 712 can be configured to incorporate the wireless communications circuit 300 of FIG. 3 to perform RF-based ranging and imaging in the wireless communications cell 304. The downlink communications signals 710D and the uplink communications signals 710U communicated between the central unit 704 and the remote units 712 are carried over a riser cable 714. The riser cable 714 may be routed through interconnect units (ICUs) 716(1)-716(3) dedicated to each of the floors 702(1)-702(3) that route the downlink communications signals 710D and the uplink communications signals 710U to the remote units 712 and also provide power to the remote units 712 via array cables 718.

Figure 8:
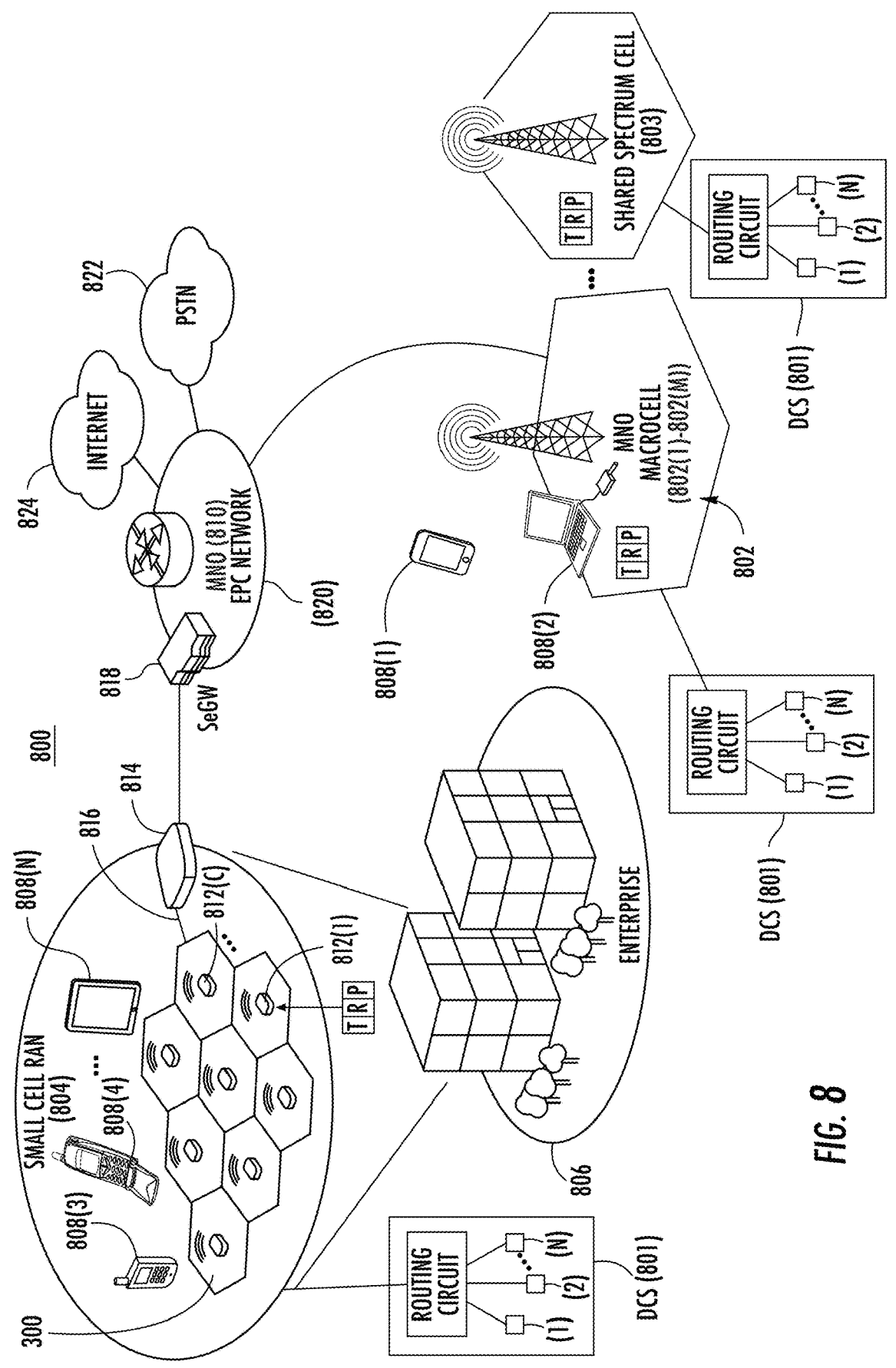
FIG. 8 is a schematic diagram of an exemplary mobile telecommunications environment that includes an exemplary radio access network (RAN) that includes a mobile network operator (MNO) macrocell employing a radio node, a shared spectrum cell employing a radio node, an exemplary small cell RAN employing a multi-operator radio node located within an enterprise environment, wherein any of the radio nodes can be configured to incorporate the wireless communications circuit of FIG. 3 to perform RF-based ranging and imaging in the wireless communications cell.

The WCS 600 of FIG. 6, which includes the wireless communications circuit 300 of FIG. 3 to perform RF-based ranging and imaging in the wireless communications cell 304, can also be interfaced with different types of radio nodes of service providers and/or supporting service providers, including macrocell systems, small cell systems, and remote radio heads (RRH) systems, as examples. For example, FIG. 8 is a schematic diagram of an exemplary mobile telecommunications environment 800 (also referred to as "environment 800") that includes radio nodes and cells that may support shared spectrum, such as unlicensed spectrum, and can be interfaced to shared spectrum distributed communications systems (DCSs) 801 supporting coordination of distribution of shared spectrum from multiple service providers to remote units to be distributed to subscriber devices. The shared spectrum DCSs 801 can include the WCS 600 of FIG. 6 as an example.

The environment 800 includes exemplary macrocell RANs 802(1)-802(M) ("macrocells 802(1)-802(M)") and an exemplary small cell RAN 804 located within an enterprise environment 806 and configured to service mobile communications between a user mobile communications device 808(1)-808(N) to a mobile network operator (MNO) 810. A serving RAN for a user mobile communications device 808(1)-808(N) is a RAN or cell in the RAN in which the user mobile communications devices 808(1)-808(N) have an established communications session with the exchange of mobile communications signals for mobile communications. Thus, a serving RAN may also be referred to herein as a serving cell. For example, the user mobile communications devices 808(3)-808(N) in FIG. 8 are being serviced by the small cell RAN 804, whereas user mobile communications devices 808(1) and 808(2) are being serviced by the macrocell 802. The macrocell 802 is an MNO macrocell in this example. However, a shared spectrum RAN 803 (also referred to as "shared spectrum cell 803") includes a macrocell in this example and supports communications on frequencies that are not solely licensed to a particular MNO and thus may service user mobile communications devices 808(1)-808(N) independent of a particular MNO. For example, the shared spectrum cell 803 may be operated by a third party that is not an MNO and wherein the shared spectrum cell 803 supports CBRS. Also, as shown in FIG. 8, the MNO macrocell 802, the shared spectrum cell 803, and/or the small cell RAN 804 can interface with a shared spectrum DCS 801 supporting coordination of distribution of shared spectrum from multiple service providers to remote units to be distributed to subscriber devices. The MNO macrocell 802, the shared spectrum cell 803, and the small cell RAN 804 may be neighboring radio access systems to each other, meaning that some or all can be in proximity to each other such that a user mobile communications device 808(3)-808(N) may be able to be in communications range of two or more of the MNO macrocell 802, the shared spectrum cell 803, and the small cell RAN 804 depending on the location of user mobile communications devices 808(3)-808(N).

In FIG. 8, the mobile telecommunications environment 800 in this example is arranged as an LTE (Long Term Evolution) system as described by 3GPP as an evolution of the GSM/UMTS standards (Global System for Mobile communication/Universal Mobile Telecommunications System). It is emphasized, however, that the aspects described herein may also be applicable to other network types and protocols. The mobile telecommunications environment 800 includes the enterprise 806 in which the small cell RAN 804 is implemented. The small cell RAN 804 includes a plurality of small cell radio nodes 812(1)-812(C). Each small cell radio node 812(1)-812(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated. In a non-limiting example, each of the small cell radio nodes 812(1)-812(C) can be configured to incorporate the wireless communications circuit 300 of FIG. 3 to perform RF-based ranging and imaging in the wireless communications cell 304.

In FIG. 8, the small cell RAN 804 includes one or more services nodes (represented as a single services node 814) that manage and control the small cell radio nodes 812(1)-812(C). In alternative implementations, the management and control functionality may be incorporated into a radio node, distributed among nodes, or implemented remotely (i.e., using infrastructure external to the small cell RAN 804). The small cell radio nodes 812(1)-812(C) are coupled to the services node 814 over a direct or local area network (LAN) connection 816 as an example, typically using secure IPsec tunnels. The small cell radio nodes 812(1)-812(C) can include multi-operator radio nodes. The services node 814 aggregates voice and data traffic from the small cell radio nodes 812(1)-812(C) and provides connectivity over an IPsec tunnel to a security gateway (SeGW) 818 in a network 820 (e.g., evolved packet core (EPC) network in a 4G network, or 5G Core in a 5G network) of the MNO 810. The network 820 is typically configured to communicate with a public switched telephone network (PSTN) 822 to carry circuit-switched traffic, as well as for communicating with an external packet-switched network such as the Internet 824.

The environment 800 also generally includes a node (e.g., eNodeB or gNodeB) base station, or "macrocell" 802. The radio coverage area of the macrocell 802 is typically much larger than that of a small cell where the extent of coverage often depends on the base station configuration and surrounding geography. Thus, a given user mobile communications device 808(3)-808(N) may achieve connectivity to the network 820 (e.g., EPC network in a 4G network, or 5G Core in a 5G network) through either a macrocell 802 or small cell radio node 812(1)-812(C) in the small cell RAN 804 in the environment 800.

Figure 9:
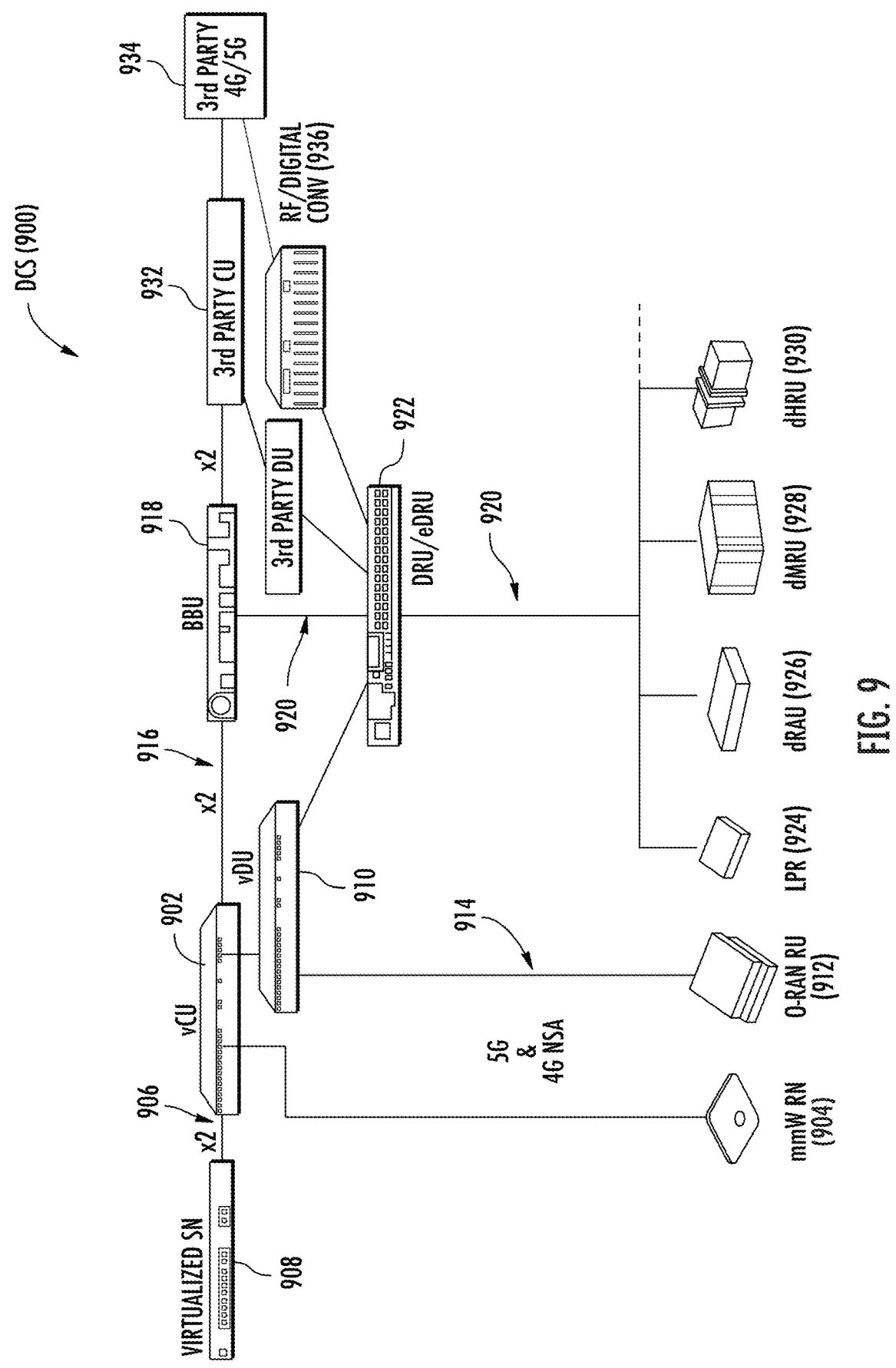
FIG. 9 is a schematic diagram of an exemplary distributed communications system that supports 4G and 5G communications services, and wherein any of the radio nodes can be configured to perform RF-based ranging and imaging in the wireless communications cell.

FIG. 9 is a schematic diagram of another exemplary DCS 900 that supports 4G and 5G communications services, and wherein any of the radio nodes can be configured to provide feedbackless interference estimation and suppression, according to any of the embodiments herein. The DCS 900 supports both legacy 4G LTE, 4G/5G non-standalone (NSA), and 5G communications systems. As shown in FIG. 9, a centralized services node 902, such as the central unit 326 in FIG. 3, is provided that is configured to interface with a core network to exchange communications data and distribute the communications data as radio signals to remote units. In this example, the centralized services node 902 is configured to support distributed communications services to a millimeter wave (mmW) radio node 904. The functions of the centralized services node 902 can be virtualized through an x2 interface 906 to another services node 908. The centralized services node 902 can also include one or more internal radio nodes that are configured to be interfaced with a distribution node 910 to distribute communications signals for the radio nodes to an open RAN (O-RAN) remote unit 912 that is configured to be communicatively coupled through an O-RAN interface 914.

The centralized services node 902 can also be interfaced through an x2 interface 916 to a baseband unit (BBU) 918 that can provide a digital signal source to the centralized services node 902. The BBU 918 is configured to provide a signal source to the centralized services node 902 to provide radio source signals 920 to the O-RAN remote unit 912 as well as to a distributed router unit (DRU) 922 as part of a digital DAS. The DRU 922 is configured to split and distribute the radio source signals 920 to different types of remote units, including a lower power remote unit (LPR) 924, a radio antenna unit (dRAU) 926, a mid-power remote unit (dMRU) 928, and a high power remote unit (dHRU) 930. The BBU 918 is also configured to interface with a third party central unit 932 and/or an analog source 934 through an RF/digital converter 936.

Figure 10:
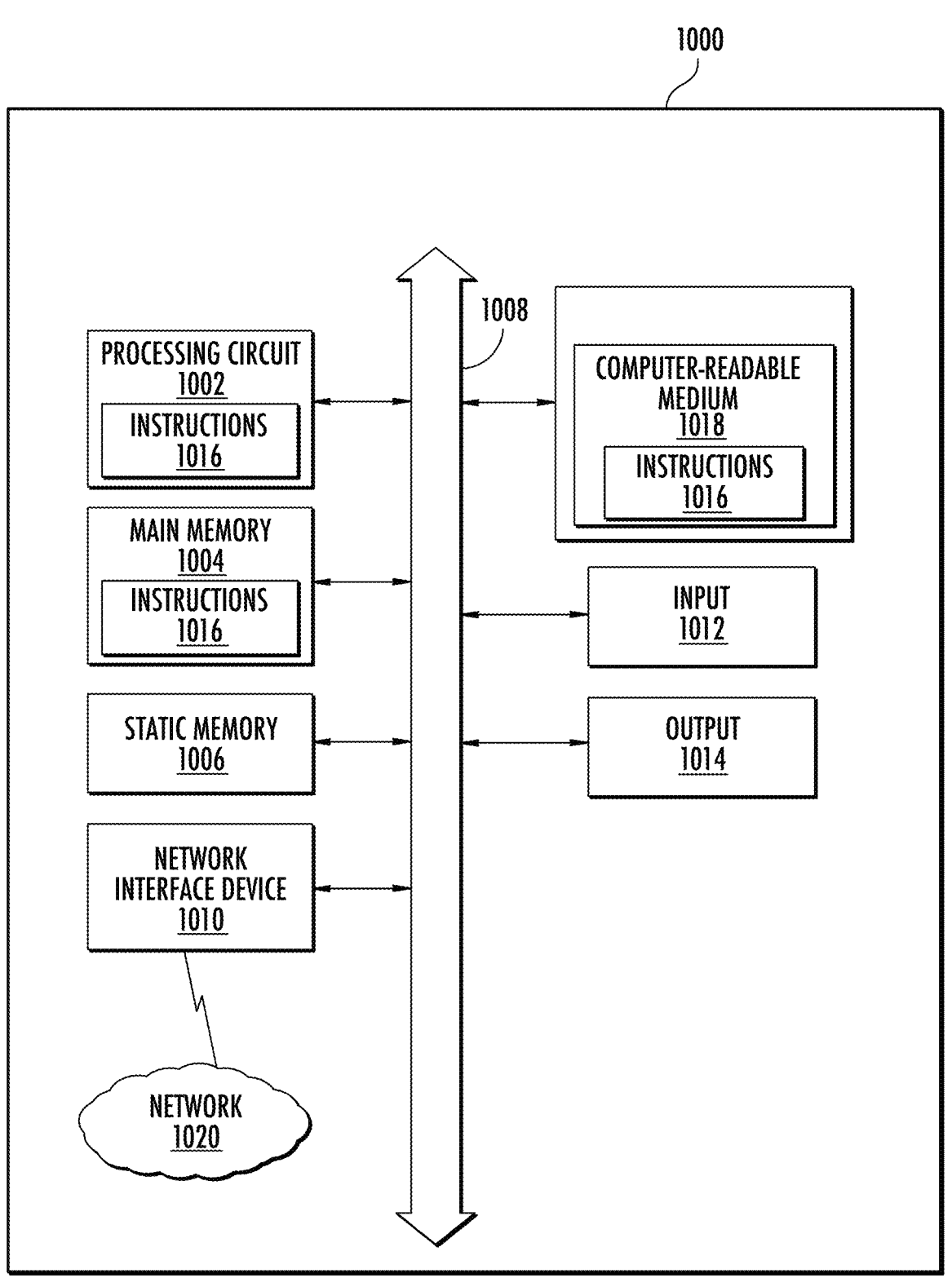
FIG. 10 is a schematic diagram of a representation of an exemplary computer system that can be included in or interface with any of the components in the wireless communications circuit of FIG. 3, wherein the exemplary computer system is configured to execute instructions from an exemplary computer-readable medium to perform RF-based ranging and imaging in the wireless communications cell.

Any of the circuits in the wireless communications circuit 300 of FIG. 3 (e.g., the RSP circuit 308) can include a computer system 1000, such as shown in FIG. 10, to perform RF-based ranging and imaging in the wireless communications cell 304. With reference to FIG. 10, the computer system 1000 includes a set of instructions for causing the multi-operator radio node component(s) to provide its designed functionality, and their circuits discussed above. The multi-operator radio node component(s) may be connected (e.g., networked) to other machines in a LAN, an intranet, an extranet, or the Internet. The multi-operator radio node component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 1000 in this embodiment includes a processing circuit or processor 1002, a main memory 1004 (e.g., read-only memory (ROM), flash memory, dynamic random access memory (DRAM) such as synchronous DRAM (SDRAM), etc.), and a static memory 1006 (e.g., flash memory, static random access memory (SRAM), etc.), which may communicate with each other via a data bus 1008. Alternatively, the processing circuit 1002 may be connected to the main memory 1004 and/or static memory 1006 directly or via some other connectivity means. The processing circuit 1002 may be a controller, and the main memory 1004 or static memory 1006 may be any type of memory.

The processing circuit 1002 represents one or more general-purpose processing circuits such as a microprocessor, central processing unit, or the like. More particularly, the processing circuit 1002 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 1002 is configured to execute processing logic in instructions 1016 for performing the operations and steps discussed herein.

The computer system 1000 may further include a network interface device 1010. The computer system 1000 also may or may not include an input 1012 to receive input and selections to be communicated to the computer system 1000 when executing instructions. The computer system 1000 also may or may not include an output 1014, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1000 may or may not include a data storage device that includes instructions 1016 stored in a computer-readable medium 1018. The instructions 1016 may also reside, completely or at least partially, within the main memory 1004 and/or within the processing circuit 1002 during execution thereof by the computer system 1000, the main memory 1004 and the processing circuit 1002 also constituting computer-readable medium. The instructions 1016 may further be transmitted or received over a network 1020 via the network interface device 1010.

While the computer-readable medium 1018 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing circuit and that cause the processing circuit to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters," and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred. It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method for performing radio frequency (RF)-based ranging and imaging in a wireless communications circuit, comprising:

radiating an RF probing signal in a plurality of radiation directions in a wireless communications cell;

absorbing a plurality of RF reflection signals corresponding to the RF probing signal radiated in the plurality of radiation directions;

converting the plurality of RF reflection signals into a plurality of digital reflection signals, respectively;

processing the plurality of digital reflection signals based on timing and directionality information related to the RF probing signal to detect one or more obstacles in the wireless communications cell;

generating a surrounding image of the wireless communications cell comprising the one or more detected obstacles;

determining and eliminating a redundant digital reflection signal among the plurality of digital reflection signals that corresponds to a multi-pathed RF reflection signal among the plurality of RF reflection signals and has a propagation duration longer than a predetermined threshold; and determining an updated position based on the surrounding image.

2. The method of claim 1, further comprising repositioning the wireless communications circuit from a present position to the updated position.

3. The method of claim 2, further comprising:

identifying the one or more obstacles in the surrounding image; and determining the updated position based on the one or more identified obstacles.

4. The method of claim 1, further comprising:

receiving a digital signal from a central unit coupled to the wireless communications circuit; extracting the timing and directionality information from the digital signal; and converting the digital signal into the RF probing signal.

5. The method of claim 4, further comprising forming a plurality of RF beams via an antenna array to radiate the RF probing signal in the plurality of radiation directions in the wireless communications cell.

6. The method of claim 5, further comprising:

receiving the digital signal comprising a digital beam discovery signal; and converting the digital beam discovery signal into the RF probing signal.

7. The method of claim 5, further comprising:

receiving the digital signal comprising a downlink digital communications signal; and converting the downlink digital communications signal into the RF probing signal.

8. The method of claim 7, further comprising radiating the RF probing signal via a directional antenna in the plurality of radiation directions in the wireless communications cell.

9. A method for performing radio frequency (RF)-based ranging and imaging in a wireless communications circuit, comprising:

absorbing a plurality of RF reflection signals corresponding to a RF probing signal radiated in a plurality of radiation directions in a wireless communications cell;

converting the plurality of RF reflection signals into a plurality of digital reflection signals, respectively;

processing the plurality of digital reflection signals based on timing and directionality information related to the RF probing signal to detect one or more obstacles in the wireless communications cell;

generating a surrounding image of the wireless communications cell comprising the one or more detected obstacles;

determining an updated position based on the surrounding image;

eliminating a redundant digital reflection signal among the plurality of digital reflection signals that corresponds to a multi-pathed RF reflection signal among the plurality of RF reflection signals and has a propagation duration longer than a predetermined threshold; and identifying the one or more obstacles in the surrounding image.

10. The method of claim 9, further comprising determining the updated position based on the one or more identified obstacles.

11. The method of claim 9, further comprising:

receiving a digital signal from a central unit coupled to the wireless communications circuit; extracting the timing and directionality information from the digital signal; and converting the digital signal into the RF probing signal.

12. The method of claim 11, further comprising forming a plurality of RF beams via an antenna array to radiate the RF probing signal in the plurality of radiation directions in the wireless communications cell.

13. The method of claim 12, further comprising:

receiving the digital signal comprising a digital beam discovery signal; and converting the digital beam discovery signal into the RF probing signal.

14. The method of claim 12, further comprising:

receiving the digital signal comprising a downlink digital communications signal; and converting the downlink digital communications signal into the RF probing signal.

15. A method for performing radio frequency (RF)-based ranging and imaging in a wireless communications circuit, comprising:

radiating an RF probing signal in a plurality of radiation directions in a wireless communications cell;

absorbing a plurality of RF reflection signals corresponding to the RF probing signal radiated in the plurality of radiation directions;

converting the plurality of RF reflection signals into a plurality of digital reflection signals, respectively;

eliminating a redundant digital reflection signal among the plurality of digital reflection signals that corresponds to a multi-pathed RF reflection signal among the plurality of RF reflection signals and has a propagation duration longer than a predetermined threshold;

processing the plurality of digital reflection signals based on timing and directionality information related to the RF probing signal to detect one or more obstacles in the wireless communications cell;

generating a surrounding image of the wireless communications cell comprising the one or more detected obstacles;

receiving a digital signal from a central unit coupled to the wireless communications circuit;

extracting the timing and directionality information from the digital signal;

converting the digital signal into the RF probing signal; and forming a plurality of RF beams via an antenna array to radiate the RF probing signal in the plurality of radiation directions in the wireless communications cell.

16. The method of claim 15, further comprising:

receiving the digital signal comprising a digital beam discovery signal; and converting the digital beam discovery signal into the RF probing signal.

17. The method of claim 16, further comprising radiating the RF probing signal via a directional antenna in the plurality of radiation directions in the wireless communications cell.

18. The method of claim 15, further comprising:

receiving the digital signal comprising a downlink digital communications signal; and converting the downlink digital communications signal into the RF probing signal.

19. The method of claim 18, further comprising radiating the RF probing signal via a directional antenna in the plurality of radiation directions in the wireless communications cell.

* * * * *